(12) United States Patent
Sano et al.

(10) Patent No.: US 10,083,794 B2
(45) Date of Patent: Sep. 25, 2018

(54) METALLIZED FILM CAPACITOR

(71) Applicant: Panasonic Intellectual Property Management Co., Ltd., Osaka (JP)

(72) Inventors: Masahito Sano, Shimane (JP); Yoshinari Nagata, Toyama (JP); Tetsuo Tanaka, Shimane (JP); Kazuo Ogawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/553,255

(22) PCT Filed: May 10, 2016

(86) PCT No.: PCT/JP2016/002283
§ 371 (c)(1),
(2) Date: Aug. 24, 2017

(87) PCT Pub. No.: WO2016/181646
PCT Pub. Date: Nov. 17, 2016

(65) Prior Publication Data
US 2018/0047506 A1 Feb. 15, 2018

(30) Foreign Application Priority Data
May 11, 2015 (JP) .................. 2015-096157

(51) Int. Cl.
*H01G 4/015* (2006.01)
*H01G 4/008* (2006.01)
(Continued)

(52) U.S. Cl.
CPC ............. *H01G 4/015* (2013.01); *H01G 4/008* (2013.01); *H01G 4/18* (2013.01); *H01G 4/252* (2013.01)

(58) Field of Classification Search
CPC .......... H01G 4/015; H01G 4/008; H01G 4/18; H01G 4/252
(Continued)

(56) References Cited

U.S. PATENT DOCUMENTS

2014/0036405 A1* 2/2014 Takeoka ................ H01G 4/005
361/273

FOREIGN PATENT DOCUMENTS

| JP | 10-189382 | 7/1998 |
| JP | 2004-087648 | 3/2004 |

(Continued)

OTHER PUBLICATIONS

International Search Report of PCT application No. PCT/JP2016/002283 dated Jul. 19, 2016.

*Primary Examiner* — Michael P McFadden
(74) *Attorney, Agent, or Firm* — McDermott Will & Emery LLP

(57) ABSTRACT

A metallized film capacitor includes a dielectric film, a first metal film electrode disposed on a surface of the dielectric film, and a second metal film electrode facing the first metal film electrode across the dielectric film. The first metal film electrode includes first and second large electrode parts separated from each other by a first slit, and a fuse provided in the first slit and connected to the first and second large electrode parts. The first metal film electrode includes an aluminum part and an aluminum-zinc part. The aluminum part contains substantially only aluminum. The aluminum-zinc part mainly contains zinc and further contains aluminum. The aluminum-zinc part is disposed at least around the first fuse.

13 Claims, 10 Drawing Sheets

(51) Int. Cl.
*H01G 4/18* (2006.01)
*H01G 4/252* (2006.01)

(58) Field of Classification Search
USPC .......................................................... 361/273
See application file for complete search history.

(56) References Cited

FOREIGN PATENT DOCUMENTS

JP  2009-164328  7/2009
JP  2013-219400  10/2013

* cited by examiner

_US 10,083,794 B2_

METALLIZED FILM CAPACITOR

This application is a U.S. national stage application of the PCT international application No. PCT/JP2016/002283 filed on May 10, 2016, which claims the benefit of foreign priority of Japanese patent application No. 2015-096157 filed on May 11, 2015, the contents all of which are incorporated herein by reference.

TECHNICAL FIELD

The present invention relates to metallized film capacitors for use in various types of electronic equipment, electrical equipment, industrial equipment, automobile electric components, and so forth.

BACKGROUND ART

Metallized film capacitors generally include capacitors using metal foil for electrodes and capacitors using evaporated metals on dielectric films for electrodes. Among these capacitors, a metallized film capacitor using a metal-deposited electrode of an evaporated metal has a smaller volume occupied by the electrode than that of a metallized film capacitor using metal foil, and can have a small size and weight. The metal-deposited electrode has high reliability to breakdown due to a self-recovery property, which is unique to the metal-deposited electrode. When a short circuit occurs in an electrical insulation defect portion, the metal-deposited electrode is evaporated and scattered around the defect portion by energy of the short circuit and is insulated so that function of the capacitor recovers. In view of these properties, metal-deposited electrodes have been widely used to date.

FIG. 10 is a top view of metallized film 100 for use in a metallized film capacitor disclosed in PTL 1.

As illustrated in FIG. 10, metallized film 100 includes dielectric film 101 and metal-deposited electrode 102 formed by vapor depositing a metal on a surface of dielectric film 101. Metal-deposited electrode 102 is divided into non-segmented electrode part 104 and segmented electrode part 106 by slit 103 extending in a longitudinal direction of dielectric film 101 (a lateral direction in FIG. 10). The inside of segmented electrode part 106 is divided into plural electrode segments 105.

Non-segmented electrode part 104 is electrically connected to segmented electrode part 106 via fuses 107 disposed in slit 103. Electrode segments 105 adjacent to each other are electrically connected to each other via fuse 108.

When an electrical insulation defect portion is produced in one of electrode segments 105 in a conventional metallized film capacitor using metallized film 100, fuse 107 or 108 is blown by a current flowing into electrode segment 105. Consequently, electrode segment 105 including the electrical insulation defect portion is electrically isolated, hence avoiding occurrence of a defect, such as a short circuit, of the metallized film capacitor.

The conventional metallized film capacitor thus has a self-protection function due to fuses 107 and 108 provided in metallized film 100.

PTL 2 discloses a metallized film capacitor using an aluminum-zinc layer.

CITATION LIST

Patent Literature

PTL 1: Japanese Patent Laid-Open Publication No. 2013-219400

PTL 2: Japanese Patent Laid-Open Publication No. 10-189382

SUMMARY

A metallized film capacitor includes a dielectric film, a first metal film electrode disposed on a surface of the dielectric film, and a second metal film electrode facing the first metal film electrode across the dielectric film. The first metal film electrode includes first and second large electrode parts separated from each other by a first slit, and a fuse provided in the first slit and connected to the first and second large electrode parts. The first metal film electrode includes an aluminum part and an aluminum-zinc part. The aluminum part contains substantially only aluminum. The aluminum-zinc part mainly contains zinc and further contains aluminum. The aluminum-zinc part is disposed at least around the first fuse.

DETAIL DESCRIPTION

Exemplary Embodiment 1

Figure 1A:
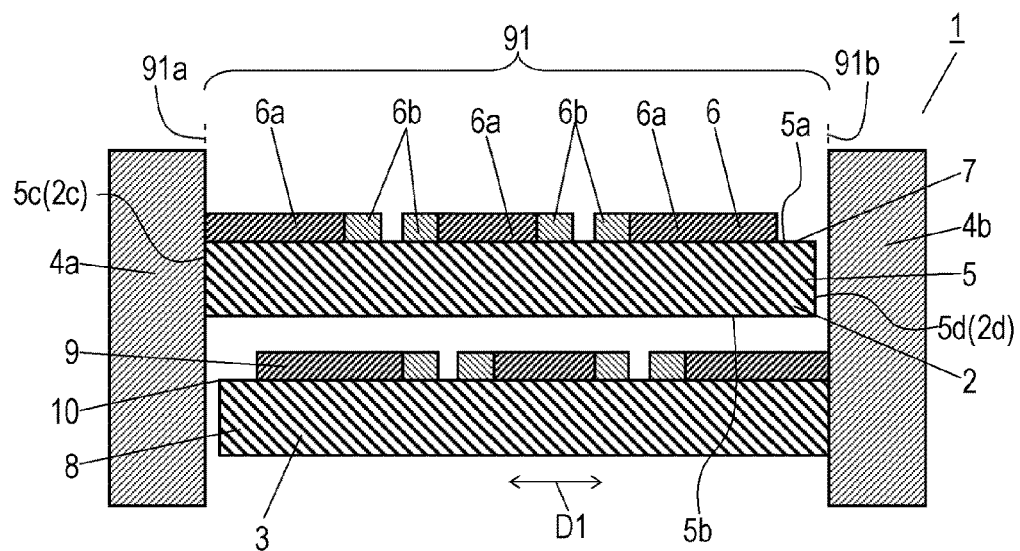
FIG. 1A is a cross-sectional view of a metallized film capacitor according to Exemplary Embodiment 1.

FIG. 1A is a cross-sectional view of metallized film capacitor 1 according to Exemplary Embodiment 1, and schematically illustrates the configuration of metallized film capacitor 1.

Figure 1B:
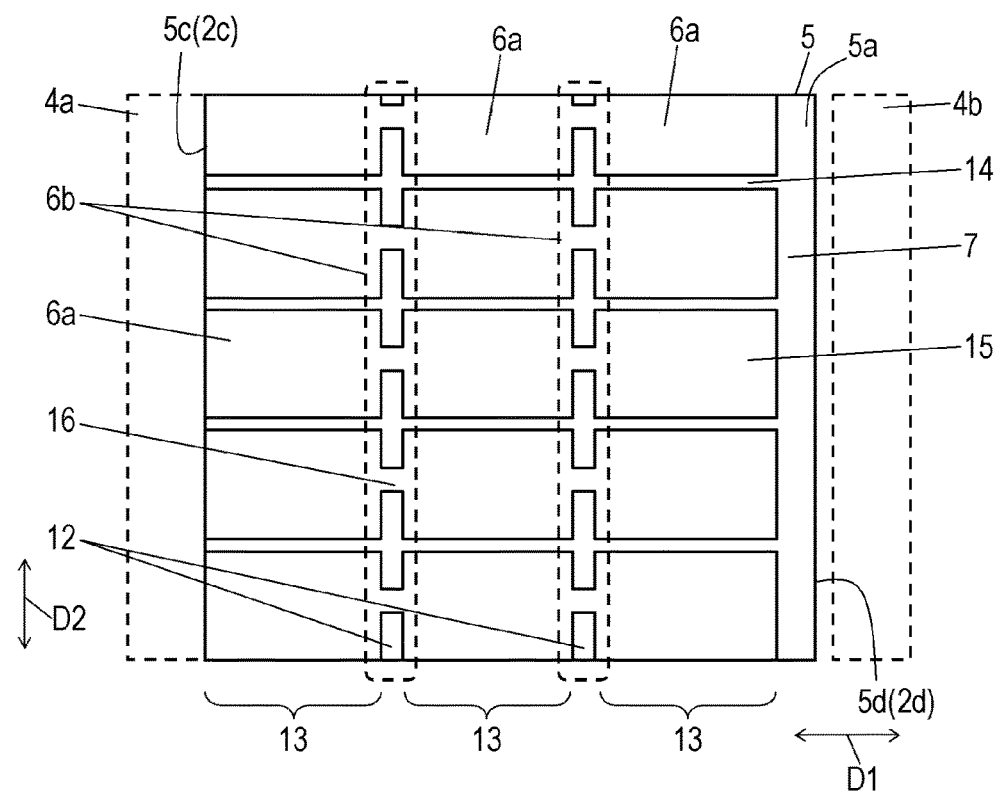
FIG. 1B is a plan view of a metallized film of the metallized film capacitor according to Embodiment 1.

Metallized film capacitor 1 includes capacitor element 91 and external electrodes 4a and 4b which are disposed on end surfaces 91a and 91b of capacitor element 91, respectively. Capacitor element 91 includes metallized film 2 and metallized film 3 stacked on metallized film 2. Metallized films 2 and 3 are wound. In accordance with Embodiment 1, external electrodes 4a and 4b are sprayed-metal electrodes. FIG. 1B is a plan view of metallized film 2.

Metallized film 2 includes dielectric film 5 and metal film electrode 6 disposed on surface 5a of dielectric film 5.

Dielectric film 5 employs a polypropylene film with a thickness of 2.8 μm. Dielectric film 5 may be a film, such as a polyethylene terephthalate film, a polyethylene naphthalate film, a polyphenyl sulfide film, or a polystyrene film, with an appropriate thickness. The thickness may be changed as appropriate.

Metal film electrode 6 includes aluminum part 6a substantially made of aluminum and aluminum-zinc part 6b mainly containing zinc and further containing aluminum. Aluminum part 6a is formed by evaporating a vapor deposition material of aluminum to spatter metal vapor of aluminum and depositing the metal vapor on surface 5a of dielectric film 5. Since aluminum part 6a in accordance with Embodiment 1 is formed by using the vapor deposition material of aluminum, aluminum part 6a contains substantially only aluminum, that is, the most part of components constituting aluminum part 6a is occupied by aluminum. In accordance with Embodiment 1, aluminum part 6a is formed by using the vapor deposition material of aluminum as described above, but a small amount of a metal, such as magnesium, except aluminum may be added to the vapor deposition material. Aluminum part 6a may contain a slight amount of an impurity except aluminum and intentionally added metal.

Aluminum part 6a may be formed by vapor depositing plural vapor deposition materials simultaneously. That is, aluminum and a small amount of a metal except aluminum may be evaporated simultaneously so that aluminum part 6a is formed by using plural types of metal vapor including metal vapor of aluminum. In this case, however, the amounts of vapor deposition materials need to be adjusted as appropriate so that aluminum occupies largest part of components constituting aluminum part 6a.

Ends 5c and 5d of dielectric film 5 opposite to each other in width direction D1 constitute ends 2c and 2d of metallized film 2 opposite to each other in width direction D1. The stacked metallized films 2 and 3 are wound in longitudinal direction D2 perpendicular to width direction D1 about a winding axis extending in width direction D1.

Insulating margin 7 where no metal film electrode 6 is provided at end 2d of metallized film 2. Surface 5a of dielectric film 5 is exposed from metal film electrode 6 in insulating margin 7. Insulating margin 7 insulates metal film electrode 6 from external electrode 4b.

Metallized film 3 has a configuration similar to that of metallized film 2. That is, metallized film 3 includes dielectric film 8 and metal film electrode 9 having configurations similar to dielectric film 5 and metal film electrode 6 of metallized film 2, respectively. Thus, metal film electrode 9 includes an aluminum part and an aluminum-zinc part. Metallized film 3 has also insulating margin 10 similar to insulating margin 7 of metallized film 2.

Metallized films 2 and 3 are stacked and wound together such that metallized films 2 and 3 slightly deviate from each other along the winding axis extending in width direction D1, thereby providing capacitor element 91. Metallized films 2 and 3 are wound such that insulating margins 7 and 10 of metallized films 2 and 3 are positioned at sides opposite to each other in width direction D1. Molten zinc is sprayed on both ends of capacitor element 91 in width direction D1 to form external electrodes 4a and 4b, thereby completing metallized film capacitor 1. As illustrated in FIG. 1A, insulating margin 7 prevents metal film electrode 6 on metallized film 2 from contacting external electrode 4b. Similarly, insulating margin 10 prevents metal film electrode 9 on metallized film 3 from contacting external electrode 4a. In capacitor element 91 of metallized film capacitor 1 according to Embodiment 1, metallized films 2 and 3 are wound, but may be stacked without being wound. To illustrate the configurations of metallized films 2 and 3, metal film electrode 9 is located away from surface 5b dielectric film 5 opposite to surface 5a of dielectric film 5 of metallized film 3 in FIG. 1A, but actually contacts surface 5b of dielectric film 5 of metallized film 3.

In actual use of metallized film capacitor 1, one of metal film electrodes 6 and 9 of metallized films 2 and 3 functions as a positive electrode while the other of metal film electrodes 6 and 9 functions as a negative electrode. Specifically, when metallized film capacitor 1 is connected to an external device, one of metal film electrodes 6 and 9 connected to a positive electrode of the external device functions as a positive electrode while the other of metal film electrodes 6 and 9 connected to a negative electrode of the external device functions as a negative electrode.

Configurations of metallized films 2 and 3 will be detailed below manly in aluminum-zinc part 6b. Metallized film 3 has a configuration identical similar to that of metallized film 2, and thus, only the configuration of metallized film 2 will be described below.

In metallized film 2, metal film electrode 6 provided on the surface of dielectric film 5 includes aluminum part 6a and aluminum-zinc part 6b. As illustrated in FIG. 1A, aluminum-zinc part 6b is electrically continuous to aluminum part 6a. Aluminum-zinc part 6b is formed by vapor depositing a vapor deposition material of zing on an aluminum core. Aluminum-zinc part 6b in accordance with Embodiment 1 is formed by temporarily forming an aluminum layer having the same composition as that of aluminum part 6a on a portion where aluminum-zinc part 6b is to be disposed, simultaneously to the forming of aluminum part 6a, and then, vapor depositing zinc on the aluminum layer. That is, the aluminum layer is temporarily formed on substantially the entire surface of a portion of surface 5a of dielectric film 5 where metal film electrode 6 is to be formed, and then, zinc is vapor deposited only on a predetermined portion so that aluminum-zinc part 6b is disposed on the predetermined portion. Aluminum part 6a is disposed on a portion except the predetermined position, thus providing metal film electrode 6. As described above, aluminum-zinc part 6b is obtained by overlaying the zinc layer on the aluminum layer. In metallized film capacitor 1 as a final product, however, aluminum and zinc migrate between the aluminum layer and the zinc layer by, e.g. diffusion with a lapse of time and are mixed together. More accurately, a portion of aluminum-zinc part 6b contacting dielectric film 5 contains a larger amount of aluminum, and a portion of aluminum-zinc part 6b opposite to dielectric film 5 contains a larger amount of zinc. Thus, aluminum-zinc part 6b is not clearly divided into an aluminum layer and a zinc layer.

As shown in FIG. 1A, to simplify the configuration of metallized film 2, the boundary between aluminum part 6a and aluminum-zinc part 6b is clearly shown, but actually, components of aluminum part 6a and aluminum-zinc part 6b migrate to each other between aluminum part 6a and aluminum-zinc part 6b by, e.g. diffusion. Thus, the boundary between aluminum part 6a and aluminum-zinc part 6b may not necessarily be clearly defined.

In the forming of the aluminum layer for forming aluminum part 6a and aluminum-zinc part 6b, only a portion of the aluminum layer where aluminum-zinc part 6b is to be formed may be locally thinner than other portions. Such a thin aluminum layer may be formed by a method of reducing the amount of metal particles of aluminum generated per a unit time by reducing a supplying rate of a vapor deposition material of aluminum, that is, the rate of feeding an aluminum wire material, only in a portion where a thin aluminum layer is to be formed. A thin aluminum layer may be formed by other methods.

Since aluminum-zinc part 6b is made of metals of zinc and aluminum, aluminum-zinc part 6b functions as an electrode of metallized film capacitor 1, similarly to aluminum part 6a.

The position where aluminum-zinc part 6b is formed will be described below.

As illustrated in FIG. 1B, two slits 12 extend straight in longitudinal direction D2 are provided in metallized film 2 in accordance with Embodiment 1. Slits 12 are portions where metal film electrode 6 is not formed to expose surface 5a of dielectric film 5 from metal film electrode 6. Before a vapor deposition process for forming metal film electrode 6, oil is previously applied onto a portion of dielectric film 5 where slits 12 are to be formed so as to disable metal particles of the vapor deposition material to be attached onto the portion in the vapor deposition process, thereby forming slits 12. Slits 12 divide metal film electrode 6 into three large electrode parts 13 arranged in width direction D1 of dielectric film 5. Each large electrode part 13 is divided into plural electrode segments 15 by slits 14 arranged in width direction D1 of dielectric film 5. Similarly to slits 12, slits 14 are formed by previously applying oil onto dielectric film 5 before the vapor deposition process. In accordance with Embodiment 1, metallized film 2 includes three large electrode parts 13, but may include two large electrode parts 13 or four or more large electrode parts 13. In accordance with Embodiment 1, electrode segments 15 have rectangular shapes, but may have other shapes, such as rhombus shapes. The shapes of electrode segments 15 are not necessarily identical to one another, and may be different from one another.

Fuses 16 disposed in slits 12 electrically connect adjacent large electrode parts 13. That is, each of fuses 16 electrically connects respective pair of electrode segments 15 adjacent to each other in width direction D1 among electrode segments 15 constituting each of large electrode parts 13. The oil for forming slits 12 is not applied to a part of a portion constituting slits 12 where fuses 16 are to be formed, and metal particles are attached to this part in the vapor deposition process, thereby forming fuses 16.

As illustrated in FIGS. 1A and 1B, aluminum-zinc part 6b is disposed around fuses 16. As illustrated in FIG. 1B, aluminum-zinc part 6b may be disposed in fuses 16. Specifically as illustrated in FIG. 1B, aluminum-zinc part 6b faces slits 12, is disposed at both sides of each of slits 12, and extends straight along slits 12 in longitudinal direction D2. In accordance with Embodiment 1, aluminum-zinc part 6b is formed in a range having a width of about 2 mm from each side of slits 12.

Advantages of metallized film capacitor 1 according to Embodiment 1 will be described below.

Aluminum is used as a material for metal-deposited electrode 102 of the conventional metallized film capacitor disclosed in PTL 1.

In the case where the metallized film capacitor using aluminum as metal-deposited electrode 102 is used, as a capacitor for home appliances, for a commercial power supply, such as a power supply of an alternating current of 100 V or a circuit before smoothing of a single phase rectifier circuit of an inverter, that is, a circuit having a large potential difference Vp–p between peaks of a voltage waveform, oxidation occurs and is promoted especially from an end of metal-deposited electrode 102 because of corona discharge, that is, so-called "electrode recession" occurs and may decrease the capacitance.

Particular in that case where the electrode recession occurs around fuse 107 so that fuse 107 is electrically blown, all electrode segments 105 that receive a current through fuse 107 are electrically isolated, hence significantly decreasing the capacitance.

In the metallized film capacitor in which especially the metal-deposited electrode is made of aluminum and which includes fuses, the capacitance thus tends to decrease due to the electrode recession.

Metallized film capacitor 1 according to Embodiment 1 can reduce the capacitance decrease due to aluminum-zinc part 6b. Aluminum-zinc part 6b disposed around fuses 16 contains zinc, which is not easily oxidized. Thus, the electrode recession can hardly occur and proceed in a portion of metal film electrode 6 around fuses 16 where aluminum-zinc part 6b is disposed. The capacitor prevents fuse 16 from blowing due to the electrode recession, thereby reducing the capacitance decrease. Metallized film capacitor 1 can maintain characteristics for a long period and has high reliability.

For example, in the conventional metallized film capacitor disclosed in PTL 2, the entire metal film electrode is constituted by an aluminum-zinc layer. Zinc exhibits greater ionization tendency than aluminum, and thus, easily reacts with outside moisture and oxygen to be readily oxidized. The oxidized zinc increases a film resistance as the entire metal film electrode and increases tan 8. Zinc this is not preferable for the entire metal film electrode. In addition, since zinc has less self-recovery property than aluminum, if zinc is used for the entire metal film electrode, high self-recovery property of aluminum is not sufficiently exhibited so that reliability of the metallized film capacitor might degrade.

In metallized film capacitor 1 according to Embodiment 1, aluminum-zinc part 6b is selectively disposed locally on a part of metal film electrode 6. Thus, metallized film capacitor 1 can reduce the capacitance decrease caused by the electrode recession while maintaining high self-recovery property of aluminum.

In metallized film capacitor 1 according to Embodiment 1, aluminum-zinc part 6b is disposed locally at both sides of slits 12 along slits 12.

Electrode recession of metal film electrode 6 occurs not only in a portion around fuses 16 but also a portion around slits 12. In accordance with Embodiment 1, aluminum-zinc part 6b is disposed at both sides of slits 12 so that electrode recession by metal film electrode 6 around slits 12 can be reduced. Thus, metallized film capacitor 1 according to Embodiment 1 can further reduce the capacitance decrease.

A method for manufacturing metallized film 2 including aluminum-zinc part 6b disposed along slits 12 will be briefly described below. The following description is not directed to all the processes for forming metallized film 2, and is focused on processes for forming aluminum-zinc part 6b along slits 12.

First, in a vapor deposition process, an aluminum layer is formed on surface 5a of dielectric film 5 by continuously conveying dielectric film 5 in longitudinal direction D2 over vapor ports from which metal vapor of aluminum is released. After that, metal vapor of zinc is blown onto a predetermined portion on the aluminum layer, thereby forming aluminum-zinc part 6b. Aluminum part 6a is formed in a portion of the aluminum layer except for the predetermined portion onto which metal vapor of zinc was blown. To selectively dispose aluminum-zinc part 6b locally along slits 12, vapor ports from which metal vapor of zinc is released may be disposed at positions corresponding to slits 12. Then, metal vapor of zinc is continuously released from the vapor ports and is blown onto the aluminum layer so that aluminum-zinc part 6b can be formed along slits 12.

Figure 2:
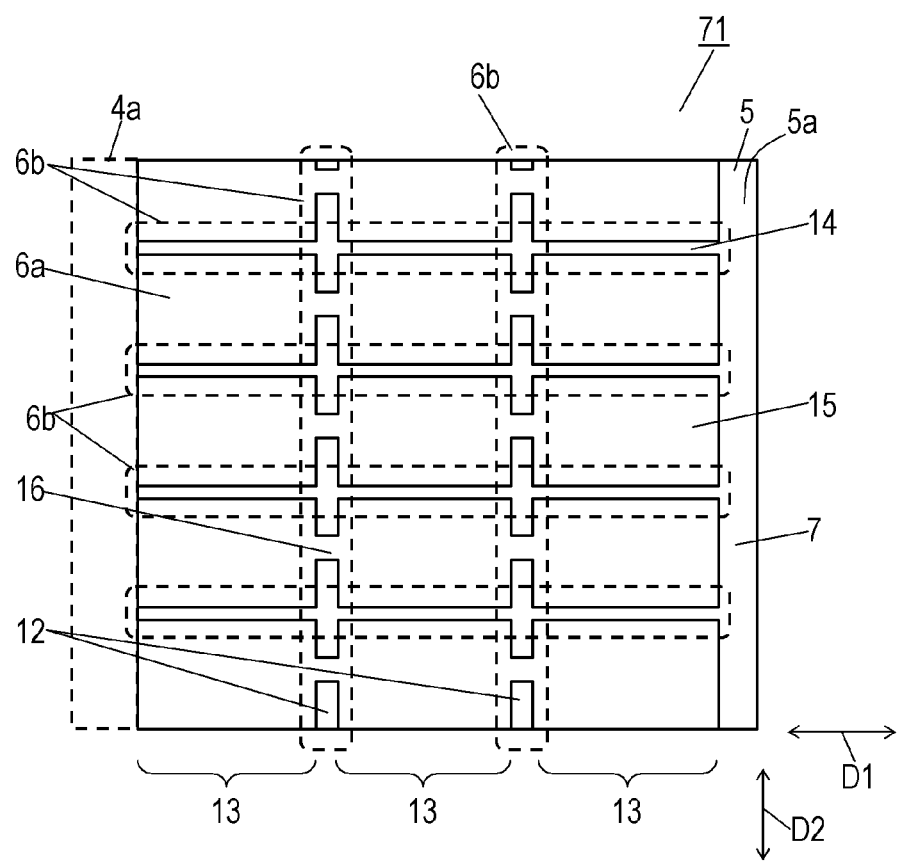
FIG. 2 is a plan view of another metallized film according to Embodiment 1.

FIG. 2 is a plan view of another metallized film 71 of metallized film capacitor 1 according to Embodiment 1. In FIG. 2, components identical to those of metallized film 2 illustrated in FIG. 1A are denoted by the same reference numerals. In metallized film 71 illustrated in FIG. 2, aluminum-zinc part 6b faces slits 12 and 14 and extends along slits 12 and 14.

Electrode recession also occurs in portions of metal film electrode 6 at both sides of each slit 14. Aluminum-zinc part 6b along slits 14 at both sides of each slit 14 reduces the capacitance decrease of metallized film capacitor 1.

A method for manufacturing metallized film 71 in which aluminum-zinc part 6b extending along slits 12 and 14 will be briefly described below.

A method for disposing aluminum-zinc part 6b along slits 12 is similar to the method described above. In addition, in order to form aluminum-zinc part 6b along slits 14, first, other vapor ports for zinc having a length substantially equal to the length of slits 14 are prepared, and are disposed in accordance with the positions of slits 14. In conveying dielectric film 5 in longitudinal direction D2, shutters of the vapor ports are opened when slits 14 pass over the vapor ports, and are otherwise closed. Zinc is vapor deposited on dielectric film 5 that is continuously conveyed with repetitive opening/closing operations of the shutters, thereby allowing aluminum-zinc part 6b to be selectively disposed locally along slits 14.

In metallized film capacitor 1 according to Embodiment 1, each of metallized films 2 and 3 includes aluminum-zinc part 6b. The structure, however, is not limited to this example, and only metallized film 2 among metallized films 2 and 3 may include aluminum-zinc part 6b.

Exemplary Embodiment 2

Figure 3:
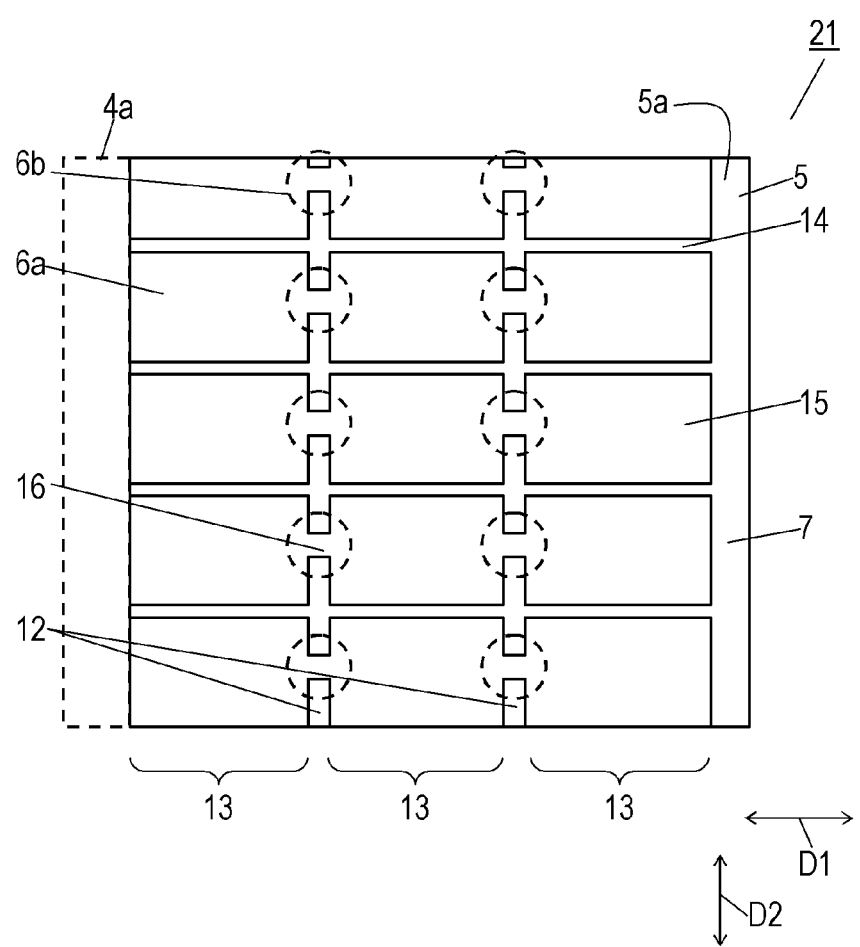
FIG. 3 is a plan view of a metallized film of a metallized film capacitor according to Exemplary Embodiment 2.

FIG. 3 is a plan view of metallized film 21 of a metallized film capacitor according to Exemplary Embodiment 2. In FIG. 3, components identical to those of metallized film 2 in accordance with Embodiment 1 illustrated in FIGS. 1A and 1B are denoted by the same reference numerals. Metallized film capacitor according to Embodiment 2 is different from that of Embodiment 1 in positions of metallized film capacitor 1 and aluminum-zinc part 6b. In the metallized film capacitor according to Embodiment 2, metallized film 3 has a configuration similar to that of metallized film 21.

In metallized film 21 illustrated in FIG. 3, aluminum-zinc part 6b is disposed only around fuses 16. Specifically, as shown in FIG. 3, aluminum-zinc part 6b is disposed only in fuses 16 and substantially circular portions around fuses 16. When electrode recession occurs in one of fuses 16, all electrode segments 15 to which a current is supplied through fuse 16 where electrode recession occurs are electrically isolated so that the capacitance of the metallized film capacitor significantly decreases. In metallized film 21 illustrated in FIG. 3, aluminum-zinc part 6b is disposed on fuses 16 that might cause the significant capacitance decrease and around fuses 16, and is not disposed along any of slits 12 and 14. That is, in the metallized film capacitor according to Embodiment 2, portions where aluminum-zinc part 6b is disposed are limited to fuses 16 that are main cause of the capacitance decrease of the metallized film capacitor and to portions around fuses 16 in order to maximize the content of aluminum on dielectric film 5. Thus, the metallized film capacitor according to Embodiment 2 more effectively exhibits high self-recovery property of aluminum.

In order to dispose aluminum-zinc part 6b only around fuses 16, the shutters of vapor ports for zinc disposed at positions corresponding to the positions of fuses 16 are opened or closed when fuses 16 pass over the vapor ports.

Exemplary Embodiment 3

Figure 4:
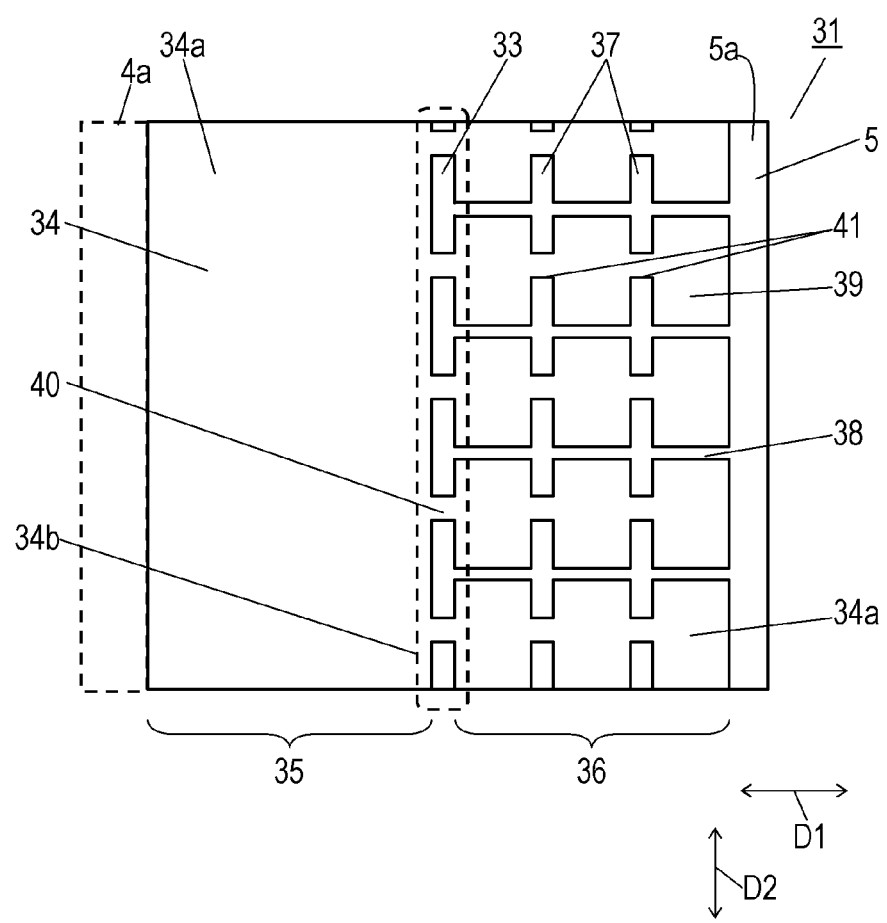
FIG. 4 is a plan view of a metallized film of a metallized film capacitor according to Exemplary Embodiment 3.

FIG. 4 is a plan view of metallized film 31 of a metallized film capacitor according to Exemplary Embodiment 3. In FIG. 4, components identical to those of metallized film 2 in accordance with Embodiment 1 illustrated in FIGS. 1A and 1B are denoted by the same reference numerals. In the metallized film capacitor according to Embodiment 3, metallized film 3 has a configuration similar to that of metallized film 31.

Metallized film 31 in accordance with Embodiment 3 includes metal film electrode 34 disposed on surface 5a of dielectric film 5, instead of metal film electrode 6 of metallized film 2 in accordance with Embodiment 1. As illustrated in FIG. 4, in metallized film 31 according to Embodiment 3, slit 33 is provided at substantially the center of dielectric film 5 in width direction D1. Slit 33 divides metal film electrode 34 into non-segmented electrode part 35 and segmented electrode part 36 that are arranged in width direction D1 of dielectric film 5.

As illustrated in FIG. 4, non-segmented electrode part 35 is continuously disposed in longitudinal direction D2 of dielectric film 5, and is a single large electrode having a rectangular having a long side in longitudinal direction D2 and a short side in width direction D1. Non-segmented electrode part 35 directly contacts external electrode 4a. Thus, a current flowing from an external device to the metallized film capacitor first flows into non-segmented electrode part 35 through external electrode 4a.

As illustrated in FIG. 4, segmented electrode part 36 is divided into plural electrode segments 39 in a lattice pattern by two slits 37 extending straight in longitudinal direction D2 and plural slits 38 extending straight in width direction D1. Each of electrode segments 39 has a rectangular shape. In accordance with Embodiment 3, electrode segments 39 are arranged straight in longitudinal direction D2 with slits 38 between electrode segments 39. Three lines each constituted by plural electrode segments 39 and partitioned by slits 37 are arranged in width direction D1. In accordance with Embodiment 3, each of electrode segments 39 has a rectangular shape, but may have other shapes, such as a rhombus shape. Electrode segments 39 do not necessarily have shapes identical to one another, and may have shapes different from one another. In accordance with Embodiment 3, three lines each constituted by plural electrode segments 39 arranged in longitudinal direction D2 are arranged in width direction D1. However, the structure is not limited to this example, and alternatively, two lines each constituted by plural electrode segments 39 arranged in longitudinal direction D2 may be arranged in width direction D1. Four or more lines each constituted by plural electrode segments 39 arranged in longitudinal direction D2 may be arranged in width direction D1.

Non-segmented electrode part 35 and segmented electrode part 36 are electrically connected to each other through plural fuses 40 provided in slit 33. Electrode segments 39 constituting the line closest to non-segmented electrode part 35 among electrode segments 39 in the lines constituting segmented electrode parts 36 are connected to non-segmented electrode part 35 via fuses 40.

In addition, electrode segments 39 adjacent to each other in width direction D1 are connected to each other via fuses 41 provided in slits 37.

That is, in actual use, a current flowing from an external device to the metallized film capacitor first flows into non-segmented electrode part 35, and then, flows into electrode segments 39 constituting the line closest to non-segmented electrode part 35 through fuses 40. After that, the current that flows into the electrode segments 39 constituting the line closest to non-segmented electrode part 35 finally flows into electrode segments 39 constituting the line farthest from non-segmented electrode part 35 through fuses 41.

In metallized film 31 having such a configuration, aluminum-zinc part 34b is disposed in fuses 40 and locally around fuses 40. Specifically, as illustrated in FIG. 4, aluminum-zinc part 34b is disposed locally at both sides of slit 33 to face slit 33 and extend straight along slit 33 in longitudinal direction D2. In accordance with Embodiment 3, aluminum-zinc part 34b is disposed within a range of a width of about 2 mm from each side of slit 33.

Aluminum part 34a is disposed in metal film electrode 34 except for aluminum-zinc part 34b, that is, in a portion except for portions at both sides of slit 33 between non-segmented electrode part 35 and segmented electrode part 36. Aluminum part 34a and aluminum-zinc part 34b have configurations similar to those of aluminum part 6a and aluminum-zinc part 6b in accordance with Embodiment 1.

With this configuration, the metallized film capacitor using metallized film 31 according to Embodiment 3 can prevent blowing of fuses 40 by reducing the electrode recession around fuses 40, thereby, reducing the capacitance decrease. In metallized film 31 in accordance with Embodiment 3, substantially a half area of surface 5a of dielectric film 5 is occupied by non-segmented electrode part 35, and slit 33 is disposed substantially at the center of surface 5a of dielectric film 5 in width direction D1. In this configuration, in the case that two metallized films are stacked in order to form the capacitor element, slits 33 of these metallized films overlap each other or are located very close to each other. In both fuses 40 disposed in slits 33 of these metallized films, the density of a current flowing therein is high, and thus, fuses 40 easily generate heat. Accordingly, a temperature rise is conspicuously observed at a center portion of the capacitor element in accordance with Embodiment 3, and oxidation degradation is easily promoted at this center portion. That is, in metallized film 31 in which slit 33 and fuses 40 are disposed substantially at the center of dielectric film 5 in width direction D1 as illustrated in FIG. 4, the electrode recession around fuses 40 is reduced to maintain fuses 40 as closely to an initial state as possible. It is effective to selectively dispose aluminum-zinc part 34b in metallized film 31 according to Embodiment 3.

In accordance with Embodiment 3, aluminum-zinc part 34b extends along slit 33 and is disposed at both sides of slit 33. The electrode recession of metal film electrode 34 around slit 33 can be reduced so that capacitance decrease can be further reduced.

Aluminum-zinc part 34b along slit 33 can be formed by a method similar to the method for forming aluminum-zinc part 6b along slits 12 of metallized film 2 in accordance with Embodiment 1.

Figure 5:
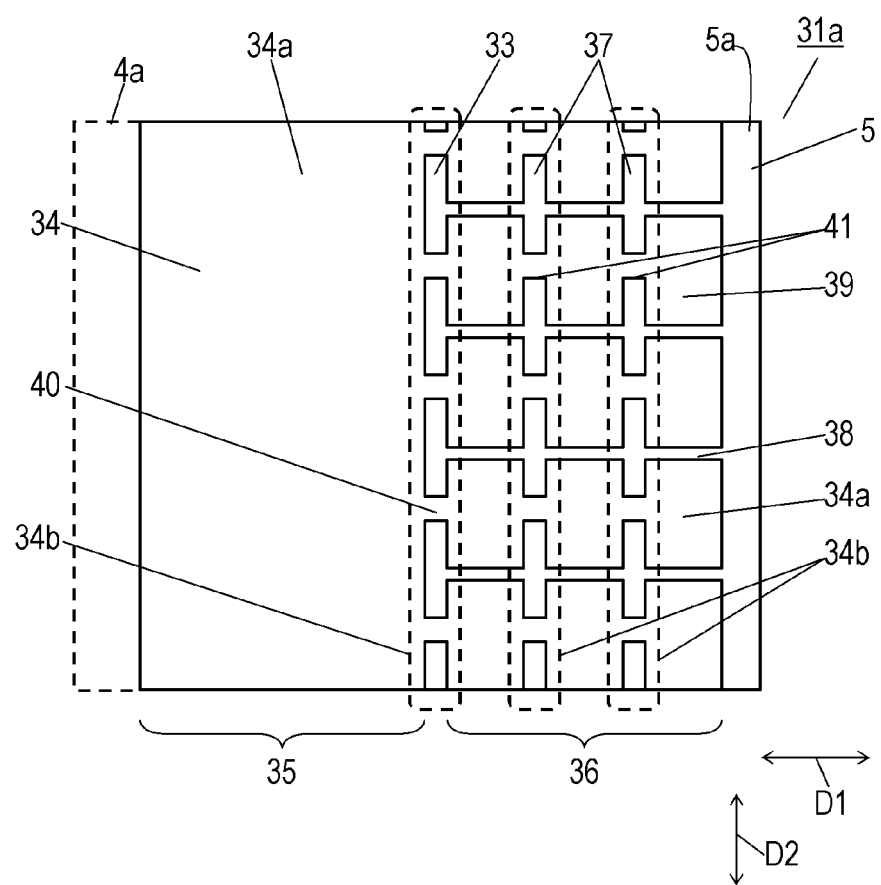
FIG. 5 is a plan view of another metallized film of the metallized film capacitor according to Embodiment 3.

FIG. 5 is a plan view of another metallized film 31a in accordance with Embodiment 3. In FIG. 5, components identical to those of metallized film 31 illustrated in FIG. 4 are denoted by the same reference numerals. In metallized film 31a illustrated in FIG. 5, aluminum-zinc part 34b faces slit 33, extends along slit 33, faces slits 37, and extends along slits 37.

This configuration reduces electrode recession occurring in fuses 41. This configuration also reduces electrode recession in metal film electrode 34 at both sides of slits 37, hence reducing the capacitance decrease of the metallized film capacitor according to Embodiment 3.

Aluminum-zinc part 34b along slits 37 may be formed by a method similar to the method for forming aluminum-zinc part 6b along slits 12 of metallized film 2 in accordance with Embodiment 1.

Figure 6:
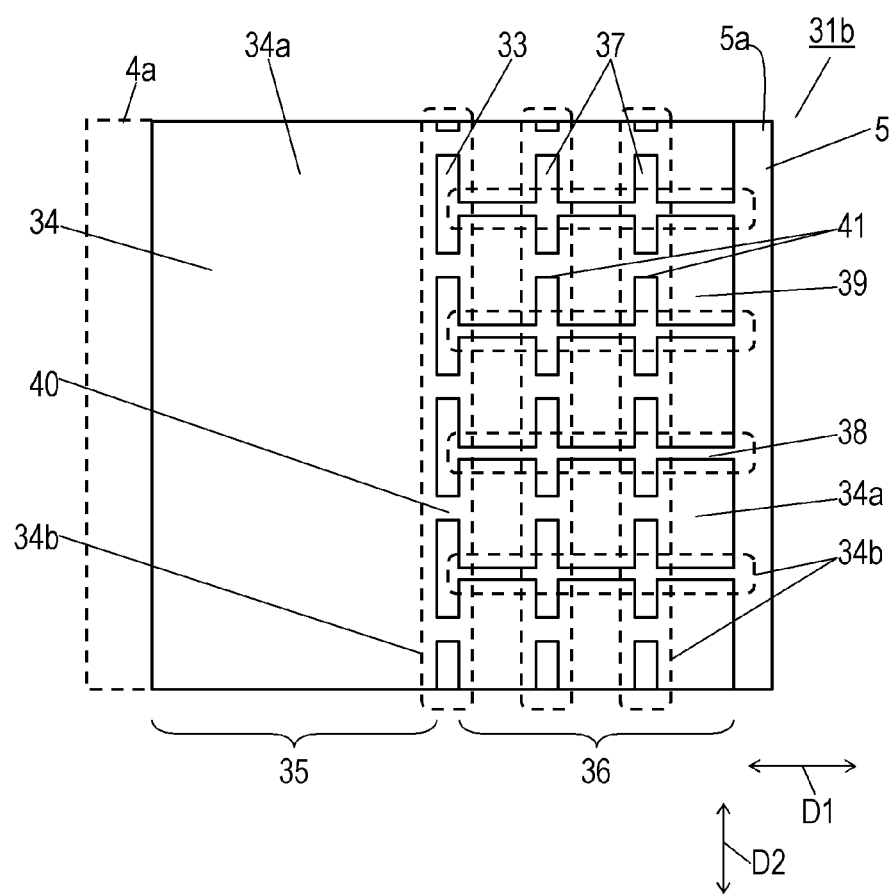
FIG. 6 is a plan view still yet another metallized film of the metallized film capacitor according to Embodiment 3.

FIG. 6 is a plan view of still another metallized film 31b in accordance with Embodiment 3. In FIG. 6, components identical to those of metallized film 31a illustrated in FIG. 5 are denoted by the same reference numerals. In metallized film 31b illustrated in FIG. 6, aluminum-zinc part 34b face slits 33, 37, and 38 and extends along slits 33, 37, and 38.

This configuration reduces electrode recession in metal film electrode 34 at both sides of slits 38, hence reducing the capacitance decrease of the metallized film capacitor according to Embodiment 3.

Aluminum-zinc part 34b along slits 38 may be formed by a method similar to the method for forming aluminum-zinc part 6b along slits 14 of metallized film 2 in accordance with Embodiment 1.

In each of metallized films 31, 31a, and 31b according to Embodiment 3, slit 33 is provided substantially at the center of dielectric film 5 in width direction D1, and substantially a half area of surface 5a of dielectric film 5 is occupied by segmented electrode part 36. The structure is not limited to this example, and the position of slit 33 may be changed so that an area of dielectric film 5 occupied by segmented electrode part 36 can be changed as appropriate.

Exemplary Embodiment 4

Figure 7:
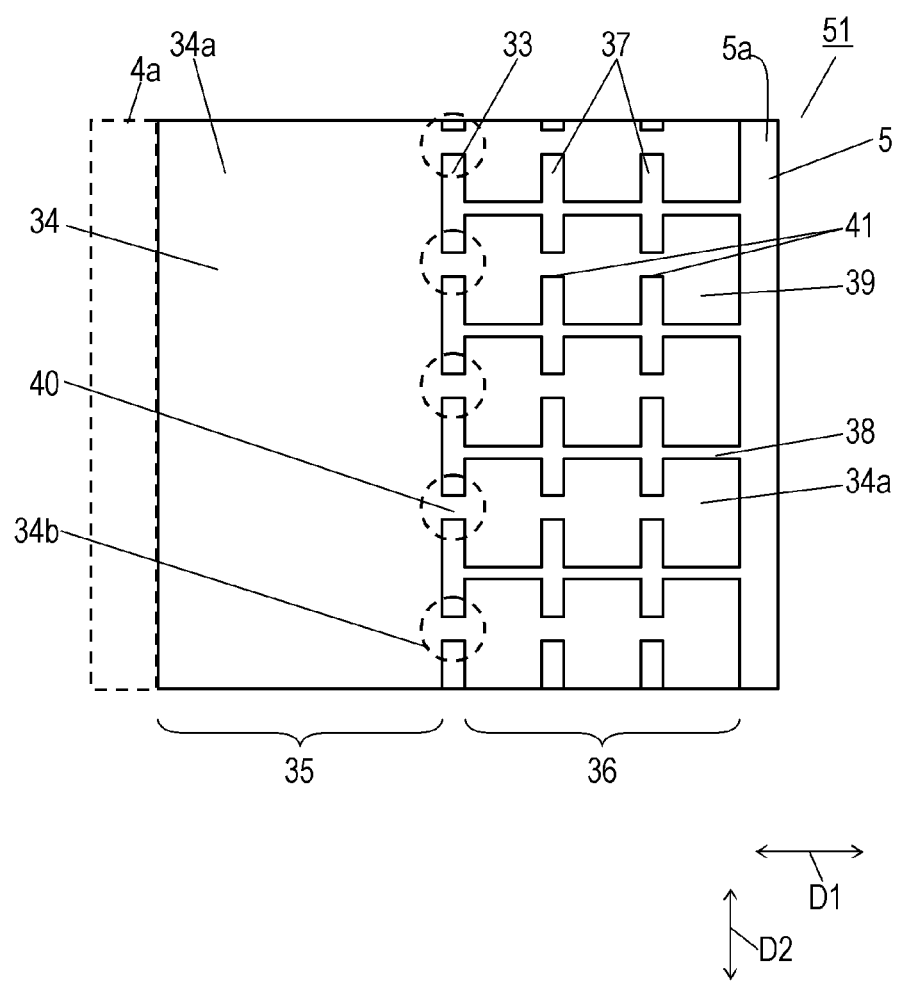
FIG. 7 is a plan view of a metallized film of a metallized film capacitor according to Exemplary Embodiment 4.

FIG. 7 is a plan view of metallized film 51 used in a metallized film capacitor according to Exemplary Embodiment 4. In FIG. 7, components identical to those of metallized film 31 in accordance with Embodiment 3 illustrated in FIG. 4 are denoted by the same reference numerals. The metallized film capacitor according to Embodiment 4 is different from the metallized film capacitor according to Embodiment 3 in positions of metallized film 31 and aluminum-zinc part 34b. In the metallized film capacitor according to Embodiment 3, metallized film 3 (see FIG. 1A) has a configuration similar to that of metallized film 51.

As illustrated in FIG. 7, in metallized film 51, aluminum-zinc part 34b is disposed only in fuses 40 and around fuses 40. Specifically, aluminum-zinc part 34b is disposed in substantially circular portions in and around fuses 40. When electrode recession occurs in one of fuses 40, all electrode segments 39 to which a current is supplied through fuses 40 where electrode recession occurs are electrically isolated, resulting in a significant decrease of the capacitance of the metallized film capacitor. In metallized film 51 illustrated in FIG. 7, aluminum-zinc part 34b is disposed only in fuses 40 that might cause the significant capacitance decrease, and is disposed along none of slits 33, 37, and 38. That is, aluminum-zinc part 34b is formed only to portions mainly causing the capacitance decrease of the metallized film capacitor, accordingly increasing the amount of aluminum on dielectric film 5. The metallized film capacitor can effectively exhibit high self-recovery property of aluminum.

Similarly to metallized film 31 in accordance with Embodiment 3 illustrated in FIG. 4, in metallized film 51, the amount of an inflow current may locally increase in fuses 40. If fuse 40 has become thin due to electrode recession, fuse 40 is easily blown, resulting in occurrence of capacitance decrease. Thus, fuses 40 are maintained in an initial state in metallized film 51 having an electrode pattern in accordance with Embodiment 4.

Figure 8:
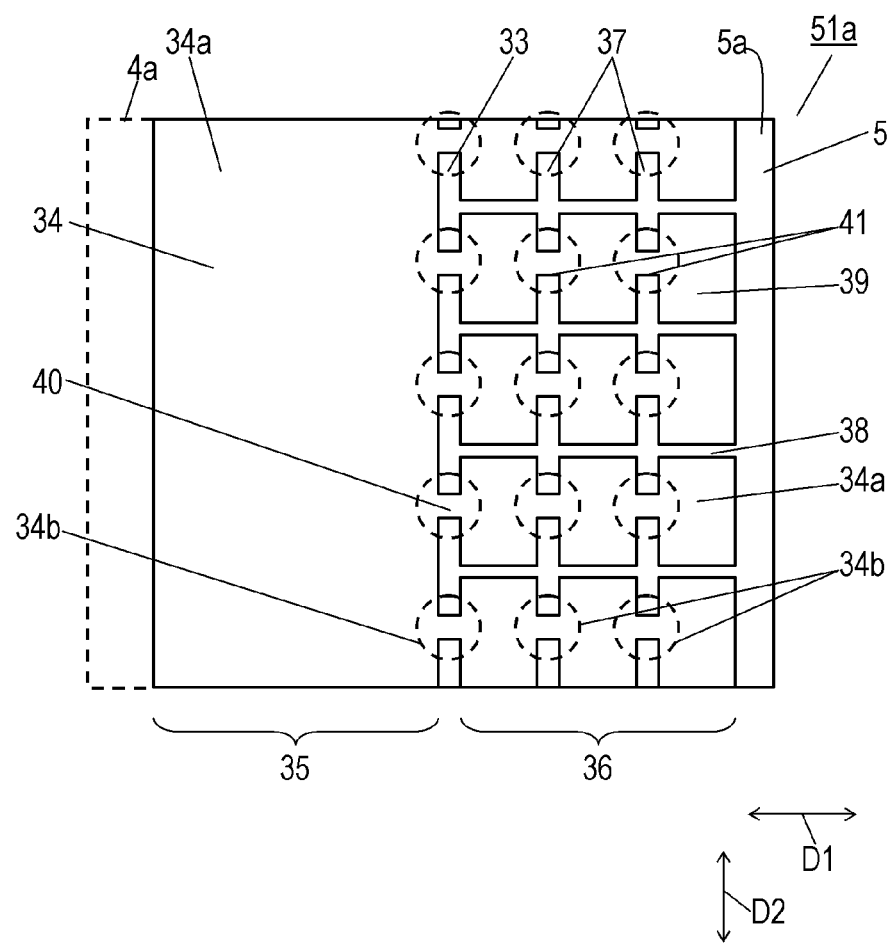
FIG. 8 is a plan view of another metallized film of the metallized film capacitor according to Embodiment 4.

FIG. 8 is a plan view of another metallized film 51a in accordance with Embodiment 4. In FIG. 8, components identical to those of metallized film 51 illustrated in FIG. 7 are denoted by the same reference numerals. In metallized film 51a illustrated in FIG. 8, aluminum-zinc part 34b is disposed in fuses 40 and around fuses 40, and is also disposed in fuses 41 and around fuses 41. This configuration reduces electrode recession occurring in fuses 41.

Aluminum-zinc part 34b may be formed on fuses 40 and 41 and around fuses 40 and 41 by a method similar to the method for forming aluminum-zinc part 6b around fuses 16 in accordance with Embodiment 2.

Exemplary Embodiment 5

Figure 9:
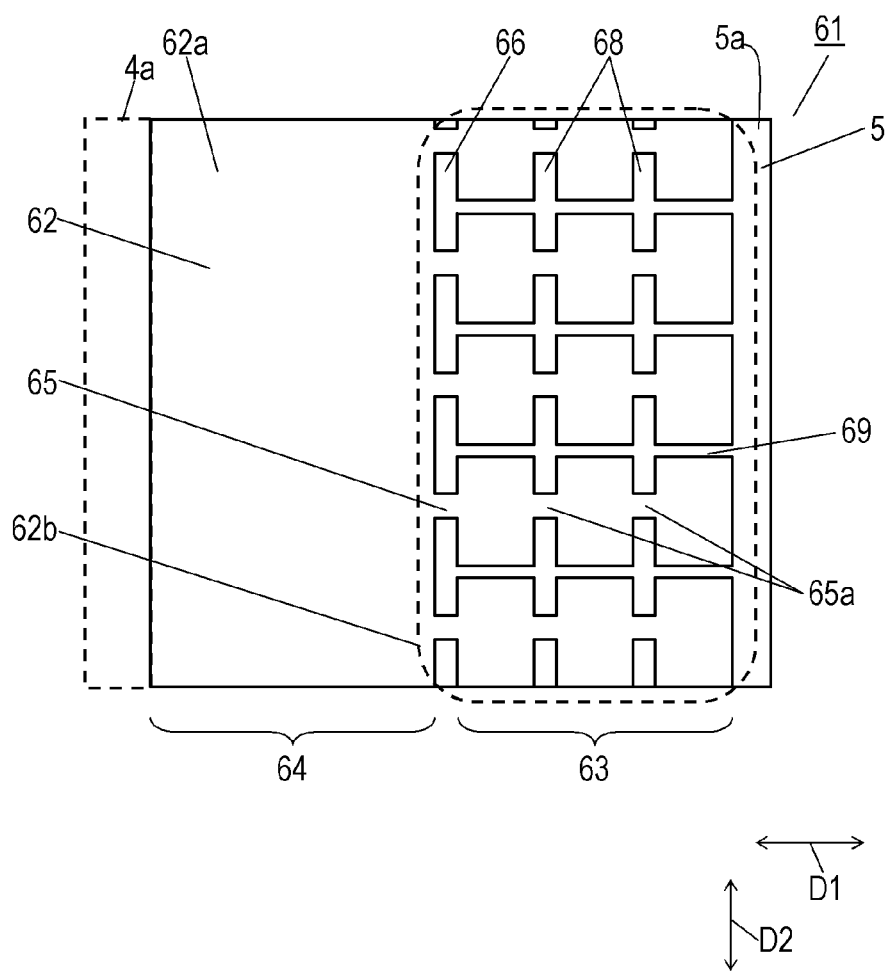
FIG. 9 is a plan view of a metallized film of a metallized film capacitor according to Exemplary Embodiment 5.
Figure 10:
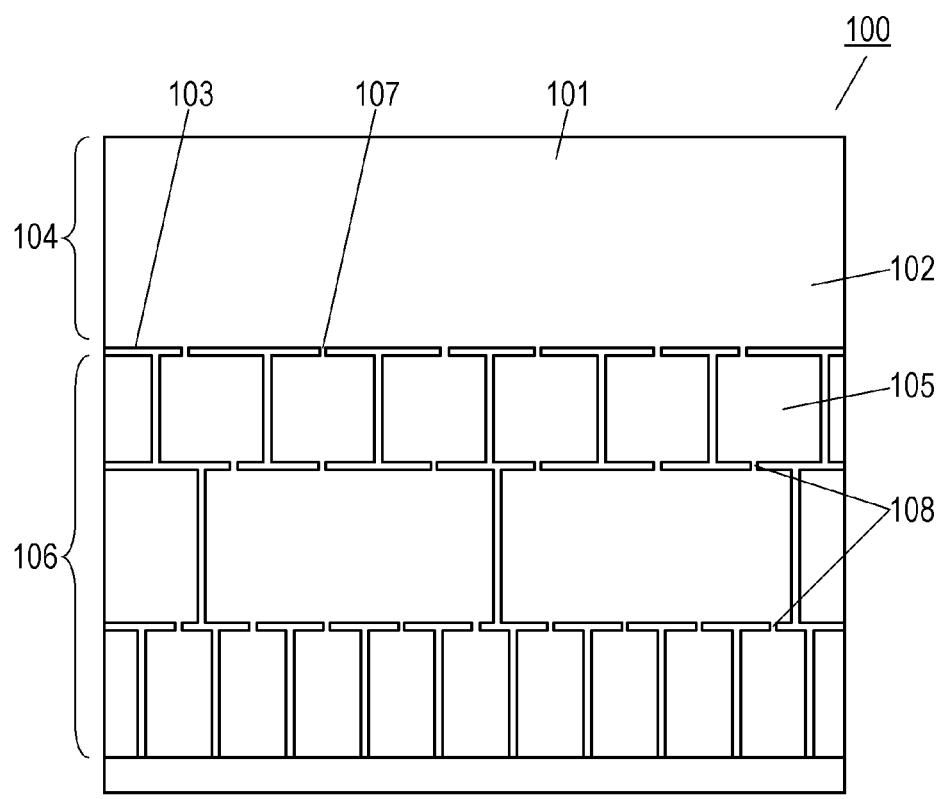
FIG. 10 is a plan view of a metallized film of a conventional metallized film capacitor.

FIG. 9 is a plan view of metallized film 61 used in a metallized film capacitor according to Exemplary Embodiment 5. In FIG. 9, components identical to those of metallized film 31 in accordance with Embodiment 3 illustrated in FIG. 4 are denoted by the same reference numerals. In the metallized film capacitor according to Embodiment 5, another metallized film 3 (see FIG. 1A) has a configuration similar to that of metallized film 61.

Metallized film 61 in accordance with Embodiment 5 includes metal film electrode 62 provided on surface 5a of dielectric film 5, instead of metal film electrode 34 of metallized film 31 in accordance with Embodiment 3. Metal film electrode 62 includes non-segmented electrode part 64, segmented electrode part 63, slits 66, 68, and 69, and fuses 65 and 65a having configurations similar to those of non-segmented electrode part 35, segmented electrode part 36, slits 33, 37, and 38, and fuses 40 and 41 of metal film electrode 34 of metallized film 31 in accordance with Embodiment 3, respectively. Fuses 65 connect segmented electrode part 63 to non-segmented electrode part 64. In segmented electrode part 63 and non-segmented electrode part 64 of metal film electrode 62 of metallized film 61, segmented electrode part 63 is entirely constituted by aluminum-zinc part 62b. More specifically, aluminum-zinc part 62b is formed on segmented electrode part 63, fuses 65, and an end of non-segmented electrode part 64 facing slit 66 and extending along slit 66. The end of non-segmented electrode part 64 along slit 66 is a region in a range of about 2 mm from the left end of slit 66 illustrated in FIG. 9 and continuously extending straight along slit 66 in longitudinal direction D2. On the other hand, a portion of non-segmented electrode part 64 excluding the end of non-segmented electrode part 64 along slit 66 is constituted by aluminum part 62a substantially made only of aluminum.

In this configuration, each of slits 66, 68, and 69 is surrounded by aluminum-zinc part 62b while aluminum-zinc part 62b is disposed over the entire portion where electrode recession might occur. As a result, electrode recession of metallized film 61 can be reduced as a whole so that the capacitance decrease of the metallized film capacitor can be reduced.

In forming the above-described configuration of metallized film 61, vapor ports are adjusted such that metal vapor of zinc is released to a portion where aluminum-zinc part 62b is to be formed, that is, to substantially a half in width direction D1 in a vapor deposition process. Aluminum-zinc part 62b of metallized film 61 in accordance with Embodiment 5 can be formed by continuously blowing metal vapor of zinc onto a portion corresponding to substantially a half in width direction D1. Thus, it is unnecessary to control opening and closing of the shutters of the vapor ports accurately, and thus, an evaporation apparatus can be relatively easily controlled. Thus, the metallized film capacitor according to Embodiment 5 has a high yield. In addition, variations of characteristics among metallized film capacitors thus manufactured are small, and the metallized film capacitor according to Embodiment 5 can be manufactured with stable quality.

In the metallized film capacitors according to the embodiments described above, a pair of metallized films in which a metal electrode film is formed only on single surface 5a of dielectric film 5 is stacked. The structure is not limited to this example, and a metallized film capacitor may include a double-sided metallized film including metal film electrodes provided both surfaces 5a and 5b of dielectric film 5. This metallized film capacitor is manufactured by winding the double-sided metallized film together with a matching film for insulating opposed metal film electrodes from each other. In this case, the aluminum-zinc part is disposed on a metal film electrode on each or one of both surfaces of the double-sided metallized film.

REFERENCE MARKS IN THE DRAWINGS 1 metallized film capacitor
2 metallized film (first metallized film)
3 metallized film (second metallized film)
4a external electrode (first external electrode)
4b external electrode (second external electrode)
5 dielectric film
6 metal film electrode (first metal film electrode)
6a aluminum part
6b aluminum-zinc part
7 insulating margin
8 dielectric film
9 metal film electrode (second metal film electrode)
10 insulating margin
12 slit (first slit)
13 large electrode part (first large electrode part, second large electrode part)
14 slit (second slit)
15 electrode segment
16 fuse (first fuse, second fuse)
21 metallized film
31 metallized film
33 slit (first slit)
34 metal film electrode (first metal film electrode)
34a aluminum part
34b aluminum-zinc part
35 non-segmented electrode part
36 segmented electrode part
37 slit (second slit)
38 slit (third slit)
39 electrode segment
40 fuse
41 fuse
51 metallized film
61 metallized film
62 metal film electrode
62a aluminum part
62b aluminum-zinc part
63 segmented electrode part
64 non-segmented electrode part 65 fuse
66 slit (first slit)
68 slit (second slit)
69 slit (third slit)

The invention claimed is:
1. A metallized film capacitor comprising:
a capacitor element including
   a dielectric film,
   a first metal film electrode disposed on a surface of the dielectric film, and
   a second metal film electrode facing the first metal film electrode across the dielectric film;
a first external electrode provided on the capacitor element and connected to the first metal film electrode; and
a second external electrode provided on the capacitor element and connected to the second metal film electrode, wherein
the first metal film electrode includes:
   a first large electrode part and a second large electrode part separated from each other by a first slit, and
   a first fuse provided in the first slit and connected to the first large electrode part and the second large electrode part,
the first metal film electrode includes an aluminum part and an aluminum-zinc part, the aluminum part containing substantially only aluminum, the aluminum-zinc part mainly containing zinc and further containing aluminum, and
the aluminum-zinc part is disposed at least around the first fuse.

2. The metallized film capacitor of claim 1, wherein the aluminum-zinc part faces the first slit and is disposed at both sides of the first slit.

3. The metallized film capacitor of claim 2, wherein the aluminum-zinc part is directly connected to the first fuse.

4. The metallized film capacitor of claim 1, wherein
the second large electrode part includes:
   a plurality of electrode segments separated from each other by a plurality of second slits; and
   a plurality of second fuses disposed in the second slits, each of the plurality of second fuses connecting respective pair of electrode segments facing each other across respective one of the plurality of second slits, and
the aluminum-zinc part faces the second slits and is disposed at both sides of each of the plurality of second slits.

5. The metallized film capacitor of claim 4, wherein the aluminum-zinc part is directly connected to the plurality of second fuses.

6. The metallized film capacitor of claim 1, wherein the aluminum-zinc part is disposed only around the first fuse.

7. A metallized film capacitor comprising:
a capacitor element including
   a dielectric film,
   a first metal film electrode disposed on a surface of the dielectric film, and
   a second metal film electrode facing the first metal film electrode across the dielectric film;
a first external electrode provided on the capacitor element and connected to the first metal film electrode; and
a second external electrode provided on the capacitor element and connected to the second metal film electrode, wherein
the first metal film electrode includes:
   a non-segmented electrode part connected to the first external electrode;
   a segmented electrode part separated from the non-segmented electrode part by a first slit, and
   a first fuse provided in the first slit and connecting the non-segmented electrode part to the segmented electrode part,
the first metal film electrode includes an aluminum part and an aluminum-zinc part, the aluminum part containing substantially only aluminum, the aluminum-zinc part mainly containing zinc and further containing aluminum,
the segmented electrode part includes a plurality of electrode segments that are separated from each other, and
the aluminum-zinc part is disposed at least around the first fuse.

8. The metallized film capacitor of claim 7, wherein the aluminum-zinc part faces the first slit and is disposed at both sides of the first slit.

9. The metallized film capacitor of claim 7, wherein
the plurality of electrode segments of the segmented electrode part are separated from each other by a second slit, and
the aluminum-zinc part faces the first slit and the second slit and is disposed at both sides of the first slit and both sides of the second slit.

10. The metallized film capacitor of claim 7, wherein
the plurality of electrode segments of the segmented electrode part are separated from each other by the second slit in a width direction of the dielectric film, and are separated from each other by a third slit in a longitudinal direction of the dielectric film, and
the aluminum-zinc part faces the first slit, the second slit, and the third slit and is disposed at both sides of the first slit, both sides of the second slit, and both sides of the third slit.

11. The metallized film capacitor of claim 7, wherein the aluminum-zinc part is disposed only around the first fuse.

12. The metallized film capacitor of claim 7, wherein
the segmented electrode part further includes a second fuse connecting the plurality of electrode segments to each other, and
the aluminum-zinc part is disposed only around the first fuse and the second fuse.

13. A metallized film capacitor comprising:
a capacitor element including
   a dielectric film,
   a first metal film electrode disposed on a surface of the dielectric film, and
   a second metal film electrode facing the first metal film electrode across the dielectric film;
a first external electrode provided on the capacitor element and connected to the first metal film electrode; and
a second external electrode provided on the capacitor element and connected to the second metal film electrode, wherein
the first metal film electrode includes:
   a non-segmented electrode part connected to the first external electrode;
   a segmented electrode part separated from the non-segmented electrode part by a first slit; and
   a first fuse provided in the first slit and connecting the non-segmented electrode part to the segmented electrode part,
the first metal film electrode includes an aluminum part and an aluminum-zinc part, the aluminum part containing substantially only aluminum, the aluminum-zinc part mainly containing zinc and further containing aluminum, the aluminum-zinc part constitutes an end of the non-segmented electrode part facing the first slit, the segmented electrode part, and the first fuse, and the aluminum part constitutes a portion the non-segmented electrode part excluding the end of the non-segmented electrode part.

* * * * *